United States Patent [19]

Paul

[11] 4,421,071

[45] Dec. 20, 1983

[54] CONTROL METHOD AND CONTROL APPARATUS FOR OPERATING A REFORMED GAS GENERATOR AND AN INTERNAL COMBUSTION ENGINE CONNECTED THERETO

[75] Inventor: Bernt Paul, Erlangen, Fed. Rep. of Germany

[73] Assignee: Siemens Aktiengesellschaft, Berlin and Munich, Fed. Rep. of Germany

[21] Appl. No.: 933,793

[22] Filed: Aug. 15, 1978

[30] Foreign Application Priority Data

Aug. 17, 1977 [DE] Fed. Rep. of Germany ....... 2737072
Aug. 19, 1977 [DE] Fed. Rep. of Germany ....... 2737531

[51] Int. Cl.[3] ........ F02C 43/08
[52] U.S. Cl. ........ 123/1 A; 123/3
[58] Field of Search ........ 123/1 A, 3, 119 E

[56] References Cited

U.S. PATENT DOCUMENTS

| | | | |
|---|---|---|---|
| 3,915,125 | 10/1975 | Henkel et al. | 123/3 |
| 4,004,554 | 1/1977 | Kosaka et al. | 123/3 |
| 4,125,090 | 11/1978 | Masunaga et al. | 123/3 |
| 4,131,086 | 12/1978 | Noguchi et al. | 123/3 |
| 4,147,136 | 4/1979 | Noguchi et al. | 123/3 |

*Primary Examiner*—Craig R. Feinberg
*Attorney, Agent, or Firm*—Kenyon & Kenyon

[57] ABSTRACT

A control system, for operating a reformed gas generator in which liquid fuel is converted with primary air and, optionally, a gas containing bound oxygen into a reformed gas, and an internal combustion engine connected thereto in which the reformed gas is burned with secondary air, which permits adaptation to changing operating conditions, in which, upon an increase of the fuel supply, the ratio of the primary air stream to the secondary air stream is increased for a short time with the increased fuel supply over the stationary condition.

24 Claims, 13 Drawing Figures

CONTROL METHOD AND CONTROL APPARATUS FOR OPERATING A REFORMED GAS GENERATOR AND AN INTERNAL COMBUSTION ENGINE CONNECTED THERETO

BACKGROUND OF THE INVENTION

This invention relates to a control system for operating a reformed gas generator, in which liquid fuel is converted with primary air and, optionally, a gas containing bound oxygen, into a reformed gas, and an internal combustion engine connected thereto, in which the reformed gas is burned with secondary air.

A method for operating such a system in which, under steady state conditions, the supply of liquid fuel and total air, and the ratio of the primary air stream to the secondary air stream are regulated to values suited for the steady state conditions, is known, for instance, from the German Offenlegungsschrift 23 06 026. This method has the advantage that fuels low in noxious substances (e.g., "straight-run" gasoline or other raw distillates which are produced in refineries in the production of gasoline, which have no additives of lead compounds or aromatics and are therefore not suitable for the operation of modern internal combustion engines, for instance, in motor vehicles, because of their relatively low octane number) can be used for the operation of internal combustion engines. Such liquid fuels are converted in the reformed gas generator, through partial oxidation, into a reformed gas which has a high octane number and burns in the internal combustion engine, developing very little nitrogen oxide, partially burned hydrocarbons, aromatics and other harmful substances.

In the Offenlegungsschrift mentioned above, it is explained that an exhaust gas low in harmful substances is produced only if the ratio, hereinafter referred to as the total air number $\lambda_{13}$, of the quantity of air which is actually supplied overall to the reformed gas generator and to the internal combustion engine, to that quantity of air which is required for stoichiometric combustion of the fuel fed in, is larger than 1. This is equivalent to saying that the air number in the combustion of the reformed gas, i.e., the ratio of the quantity of air fed to the internal combustion engine to the quantity of air required for the stoichiometric combustion of the reformed gas, is larger than 1, or that the combustion is hyperstoichiometric.

Since, however, part of the calorific value is lost in the partial oxidation of the liquid fuel in the reformed gas generator, energy saving operation of the internal combustion engine is possible only when excess primary air is not supplied to the reformed gas generator. On the other hand, a certain amount of primary air supply is necessary to maintain the necessary conversion temperature and to avoid the formation of soot in the reformed gas generator. The primary air number, called $\lambda_{12}$ hereinafter, is therefore advantageously between 0.05 and 0.2. The primary air number indicates, in the case of partial oxidation of fuel with air, the ratio of the quantity of primary air fed to the gas generator to the quantity of air which would be required for stoichiometric combustion of the converted liquid fuel. The partial oxidation can also be carried out endothermically by means of gases containing the oxygen in bound form. The primary air number then indicates how much air would have to be supplied to the fuel to obtain a reformed gas of the same gross composition. Overall, the primary air stream, the secondary air stream and, if applicable, the exhaust gas return, must be regulated under all operating conditions in such a manner that they are in definite relationships to the fuel supplied.

To this end the above-mentioned Offenlegungsschrift 23 06 026 proposes controlling, on the one hand, the fuel supply substantially in dependence on the position of the gas pedal and the engine speed, and, on the other hand, controlling a throttle, which is arranged in the suction line between the mouth of the reformed gas line and the inlet of the internal combustion engine, according to the gas pedal position. The suction underpressure present upstream from the throttle serves to: first, draw in the secondary air through the suction line, and secondly, to draw primary air into the reformed gas generator and to draw the reformed gas generated from the reformed gas generator into the intake line. An automatic throttle valve which is adapted to the flow resistance of the reformed gas generator and insures that primary air and secondary air are drawn in approximately in constant ratio is arranged in the secondary air feed. If exhaust gas from the internal combustion engine is returned into the reformed gas generator, a suitable exhaust gas metering valve insures that part of the primary air is displaced by exhaust gas without change of the primary air number.

Such apparatus does permit, under steady state operating conditions, the advantageous respective values for the air numbers to be obtained, but rapid load changes are not attainable. Rather, it has been found that a sudden increase of the engine output can be achieved only if pre-evaporated liquid fuel is introduced into the reformed gas generator from a heated supply vessel, or if the liquid fuel and the primary air are heated by an additional heating system. It is not sufficient for this purpose to heat the fuel and the primary air by heat exchange with the reformed gas produced and/or the exhaust gas alone. The above-mentioned control, furthermore, is relatively sluggish and requires careful matching to the flow conditions in the feeds, the reformed gas generator and the heat exchangers. Adaptation to the respective characteristics of the system including the reformed gas generator and internal combustion engine, which could lead to optimum operation as to emission of harmful substances, power output and fuel utilization, requires a considerable amount of technical means. If the system is designed for one mode of operation, later interventive changes are hardly possible.

SUMMARY OF THE INVENTION

It is therefore an object of the present invention to describe an improved control system for the operation of the gas generator and the internal combustion engine, which can be adapted to the respective operating conditions and also, particularly, to nonstationary operating conditions and which allows rapid load changes, for instance, fast torque increases at constant speed of rotation.

According to the present invention, this is achieved by the provision that, upon an increase of the fuel supply, the ratio of the primary air stream to the secondary air stream is increased for a short time with the increased fuel supply over the stationary condition. It is advantageous in this connection if the temporarily increased secondary air stream adjusts itself to the value of the secondary air stream which corresponds to the steady state condition of the increased fuel supply, only when the increase of the fuel supply is already completed, i.e., when the derivative of the fuel supply with respect to time has already disappeared.

If for a stepwise load increase, for instance, by rapidly pushing down the gas pedal all the way, the fuel supply is increased suddenly, this control will ensure that the evaporation air, necessary for the conversion, is available to the reformed gas generator immediately and the latter supplies the fuel required according to the changed load condition without leaning out the combustion mixture, consisting of reformed gas and secondary air, too much. The internal combustion engine can be accelerated rapidly to a new operating condition with increased load.

In addition to the fuel supply, which can be controlled, for instance by a controllable fuel pump or by magnetically controlled injection valves, the streams of primary air, secondary air and the reformed gas/secondary air mixture must be controlled in the system, to which may be added, if applicable, also the stream of a gas containing oxygen in bound form (for instance, exhaust gas or water vapor). Since the sum of primary air and secondary air is the total air, which is again found in the mixture (even though partially bound in the reformed gas), it is generally sufficient to control two of the three gas streams mentioned.

Thus, the primary air stream can be controlled by means of a throttling device in the primary air feed. It is advantageous for this purpose to calculate the desired value of a variable corresponding to the primary air stream, to measure the corresponding actual value and to position the throttling device so that the control deviation (difference between actual value and reference value) disappears. It is preferred to increase the reference value for the primary air stream for a short time when the fuel supply is increased, which leads to an overproportional opening of the throttling device in the primary air feed, relative to the increase of the fuel supply.

It is also possible to calculate and measure the desired value of a variable which corresponds to the total air stream. According to the control deviation, the primary air stream and the secondary air stream then can always be regulated separately so that the control deviation for the sum of the two streams vanishes. However, a throttling device in the mixture line of the internal combustion engine can be regulated until the control error disappears. Advantageously, the reference value for the total air stream is formed here from the position of the gas pedal or the fuel supply corresponding to a steady state operating condition (i.e., without considering the derivatives with respect to time of the fuel supply, the engine speed or other parameters). The actual value for the total stream can be obtained by summing the measured actual values for the streams of the secondary air and the primary air.

Finally, a throttling device in the secondary air feed can be used for regulating the secondary air. To this end, a variable corresponding to the primary air stream can advantageously be used and the control deviation can be used for driving the throttling device in the secondary air feed. For, if the total air stream is known, the secondary air stream can be determined by measurement of the primary air stream. Thus, it can easily be determined, for instance, from the position of the throttle, which also regulates the total air stream via the mixture stream, which reference value for the pressure drop in the primary air feed should be associated with a given reference value of the secondary air stream. For forming the control deviation when the secondary air stream is regulated, not only the pressure drop in the secondary air feed, which can be measured by means of a manometer, but also the pressure drop in the primary air feed can therefore be used. Advantageously, the secondary air stream is throttled for a short time when the fuel supply is increased, or is increased less than corresponds to the increased fuel supply.

Preferably, the three volume streams for the primary air, the secondary air and the total air are controlled independently of each other. Thus, reference values, for instance, for the primary air stream and the total air stream can advantageously be calculated, which are matched to the prevailing operating conditions, especially the nonstationary operating conditions during the load changes. If one now measures, by means of flow meters in the primary air feed and the secondary air feed, the corresponding actual values of the air streams, the primary air stream can be controlled by adjusting a throttling device in the primary air feed until the corresponding control deviation of the primary air stream disappears. From the actual values for the primary air stream and the secondary air stream, an actual value for the total air stream can be determined and a throttle which is arranged in the mixture feed at the intake of the internal combustion engine, can be adjusted until the control deviation of the total air stream disappears.

Because of the volume of the gas generator, which advantageously contains, in addition to the reaction chamber, at least one heat exchanger for preheating the primary air and/or for evaporating the liquid fuel, cooling down the reformed gas generated, the suction underpressure controlled by the throttle appears at the primary air valve only with a certain amount of delay; the primary air stream follows the corresponding control more slowly than the secondary air stream. Thus, when, for instance, the load is increased suddenly, a rapid increase of the secondary air stream will come about, but a slower increase of the primary air stream, so that the secondary air stream grows at the expense of the primary air stream and a leaning-out of the mixture results. This can be avoided if the pressure drop in the primary air feed and the secondary air feed belonging to the reference values for the primary air stream and the secondary air stream, respectively, are calculated and measured and if, with the control deviation in the secondary air feed, a second throttling device is controlled which prevents the overproportional increase of the secondary air stream.

It must be noted that the primary air stream amounts to only about 10% of the total air stream and must be adjusted accurately; the throttling device in the primary air feed could not come up to expectations if it had to control the entire pressure drop in the suction system in the range from about 0.6 bar when idling and nearly 0 at full load. If one would further attempt (which is theoretically possible) to regulate the air streams only via the throttling devices in the secondary air feed and the mixture feed, the system would have a tendency to oscillate uncontrollably. With separate control and throttling of the three volume streams for the primary air, the secondary air and the mixture at the inlet of the internal combustion engine, however, a fine control can be achieved which permits rapid load changes. Advantageously, however, it is also possible to control only the primary air stream and the total air stream or the mixture stream so that the desired values for the secondary air stream adjust themselves automatically. Preferably, a flow resistance is generated in the secondary air feed by a fixed choke; this flow resistance produces, at medium load (medium throughputs in the primary air feed and the secondary air feed), a pressure drop in the secondary air feed comparable to the pressure drop in the primary air feed and the gas generator. Using a throttle at the inlet of the internal combustion engine, the mixture stream and, equivalently thereto, the stream of the total air can then be controlled, while the ratio of primary air stream to secondary air stream can be finely controlled by increasing or decreasing the flow resistance at a throttle in the primary air line.

In the reformed gas generator, the reformed gas can be generated not only by exothermic reaction of the liquid fuel with air (free oxygen) but also by endothermic reaction with bound oxygen, for instance, water vapor or exhaust gas. Thus, for instance, exhaust gas from the internal combustion engine can be returned into the reformed gas generator. In this process, heat is converted into chemical energy, which results in higher efficiency of the installation. In addition, it becomes possible to control the reactor temperature by counteracting an increase of the reactor temperature by increased substitution of free oxygen with bound oxygen. However, this requires a certain amount of technical means and, in addition, is possible only within certain limits. Instead or as a supplement of such a temperature control, the reactor temperature can advantageously be regulated by varying the ratio of the primary air stream to the secondary air stream as a function of the reactor temperature. Preferably, the ratio is controlled according to the control deviation of the reference value from the actual value of the reactor temperature. Increasing the primary air stream leads to a more exothermic reaction and can be used to counteract dropping of the reactor temperature. In addition, the reference value of the reactor temperature can advantageously be raised for a short time when the fuel supply is increased. This leads to the desired temporary increase of the ratio of the primary air stream to the secondary air stream. It is particularly advantageous if the desired temperature value is set to the temperature reference value which corresponds to this condition of increased fuel supply, only a short time after a new steady state condition corresponding to the increased fuel supply is reached.

The fuel supply can be regulated in direct dependence on the position of the gas pedal, the air streams being adjusted in direct dependence on the varying fuel supply, i.e., as a function of the fuel supply. However, it is also possible to regulate the air streams in direct dependence of the gas pedal position; for instance, the gas pedal position can be used directly for controlling the throttle in the mixture line. The fuel supply can then likewise be regulated in direct dependence on the gas pedal position or also in direct dependence on the total air supply. It is ensured here, too, that the fuel supply, the primary air stream and the secondary air stream are always in a suitable ratio with respect to each other.

For controlling a reformed gas generator followed by an internal combustion engine it is advantageous, also for less sudden load changes, to calculate in a first electronic computing stage the reference values for the fuel supply and two of the three air numbers for the primary air ($\lambda_{12}$), the secondary air ($\lambda_{23}$) and the total air ($\lambda_{13}$), taking into consideration the instantaneous operating condition and the characteristics of the internal combustion engine and the reformed gas generator. From these reference values, the reference values of at least two of the volume streams of the primary air $L_V$, the secondary air $L_M$ and the total air $L_G$ are then calculated in a second electronic computing stage. The fuel supply B and the volume streams are then regulated to the calculated reference values.

In order to optimize the stream, including the reformed gas generator and internal combustion engine with respect to power output, acceleration, specific fuel consumption and the concentrations of the individual noxious substances in the exhaust gas, the streams of fuel B, primary air ("evaporation air" $L_V$) and secondary air ("engine air" $L_M$) and, if partial return of the exhaust gas stream A produced is provided, the exhaust gas substream $A_R$, must be carefully matched to each other and to the characteristics of the internal combustion engine and the reformed gas generator. However, on the basis of general stoichiometric relations, the desired values for these streams can be reduced to desired values for the air numbers, the fuel supply B and the fraction $b_a$ of the fuel share to be converted by exhaust gas. The streams $L_V$, $L_M$ and $A_R$ depend on B, $\lambda_{12}$, $\lambda_{13}$ and $b_a$ in an unequivocal manner via stoichimetric relations.

For the stoichiometric combustion of a quantity B of liquid fuel, a quantity of air L is required which depends only on the composition of the liquid fuel;

$$L/B = \text{const ("air-fuel ratio")} \quad (1)$$

For "straight-run" gasoline, a raw gasoline with a density of 734.8 g/l and a ratio of hydrogen atoms to carbon atoms of 2.068 and with 20.95 vol. % oxygen in the air, the value is 14.98 g air/g gasoline. If one considers the reformed gas generator and the internal combustion engine as one overall system, in which the liquid fuel B (state 1) is converted into a quantity of exhaust gas A (state 3) while a total quantity of air $L_G$ is supplied, the process can be represented by the formula $$B+\lambda_{13}L \rightarrow A \quad (2)$$

where $\lambda_{13}$ is the ratio of the total air supplied to the stoichiometric amount of air L. In the method, the process is carried out via an intermediate stage (state 2), however, where in the first stage only the quantity of air $\lambda_{12}L$ is supplied and a quantity S of reformed gas is generated:

$$B+\lambda_{12}L \rightarrow S \quad (3)$$

$$S+\lambda_{23}L \rightarrow A. \quad (4)$$

The following holds here:

$$\lambda_{12}+\lambda_{23}=\lambda_{13}. \quad (5)$$

If mass budgets are now set up for the masses of the individual atoms occurring in the fuel, the air and in the reformed gas, the following equations are obtained for the reactions (2) and (3):

$$A=B+\lambda_{13}L, \quad (6)$$

$$S=B+\lambda_{12}L. \quad (7)$$

As to quantity and gross composition, the exhaust gas and the reformed gas are therefore characterized by the air numbers $\lambda_{12}$ and $\lambda_{13}$ alone. Only for the reaction with air (without exhaust gas), the following applies:

$$L_V=\lambda_{12}L \text{ and } L_M=\lambda_{23}L.$$

However, a reformed gas of the same gross composition can also be generated if a fraction x of the exhaust gas A generated in the overall reaction (2) is conducted into the reformed gas generator instead of the quantity of air $\lambda_{12}$L. Then, only a fraction y of the exhaust gas A generated is produced in accordance with the reaction $$B+x.A\rightarrow y.S \quad (8)$$

with the corresponding mass budget $$B+x.(B+\lambda_{13}L)=y.(B+\lambda_{12}L) \quad (9)$$

As this relationship must be fulfilled for all values of B, $\lambda_{12}$ and $\lambda_{13}$, the following must hold:

$$x=\lambda_{12}/(\lambda_{13}-\lambda_{12}) \quad (10)$$

$$y=\lambda_{13}/(\lambda_{13}-\lambda_{12}) \quad (11)$$

If in the conversion of the fuel in the reformed gas generator, a fraction $b_a$ of the primary air is replaced by exhaust gas, only the quantity $(1-b_a)$.B of the liquid fuel is reacted according to formula (3) and the quantity $b_a$.B according to formula (8). Considering equations (10) and (11), one obtains therefore for the mass of the primary air supplied and of the exhaust gas supplied:

$$L_V=L.(1-b_a).\lambda_{12} \quad (12)$$

$$A_R=(\lambda_{12}.b_a.A)/(\lambda_{13}-\lambda_{12}). \quad (13)$$

The difference between the total quantity of air supplied $L_G=\lambda_{13}$L and the primary air $L_V$ yields the secondary air $$L_M=L_G-L_V=\lambda_{13}L-L_V \quad (14)$$

$$L_M\{=\lambda_{13}-(1-b_a)\lambda_{12}\}.L \quad (15)$$

Equations (1), (12), (13) and (14) therefore determine the mutual dependence of the streams of substance (mass flow). The control of the mass flows can be accomplished by regulating the supplied streams of liquid fuel, primary air, secondary air and, if applicable, bound oxygen (especially exhaust gas) to reference values which are formed in two steps in an electronic control unit. In the first step, the quantities, determined from the family of characteristics of the internal combustion engine and matched to the respective operating condition, for the supply of the liquid fuel, two of the three air numbers for the primary air ($\lambda_{12}$), the secondary air ($\lambda_{23}$) and the total air ($\lambda_{12}$) and, if applicable for the fraction $b_a$ of the primary air to be replaced by the bound oxygen, are determined from the position of the gas pedal, the speed of the engine and the reactor temperature. In the second step, the reference values for the volume streams to be regulated are formed from these quantities, independently of the family of characteristics of the internal combustion engine.

The method thus utilizes the stoichiometric relationships by determining in a first stage of a control device $\lambda_{12}$, $\lambda_{13}$, B and $b_a$. Characteristics of the system are taken into consideration. Thus, for instance, $\lambda_{12}$ can be increased at low engine speeds or in the event of sudden load change conditions and $b_a$ can be increased with rising reactor temperature. These variables are entered as inputs into the second stage of the control device and are used there as reference variables for regulating the corresponding mass flows $L_V$, $L_M$ and A.

In the first stage, other variables which characterize the same physical-chemical situation, can also be used, of course, instead of the air numbers, for instance, instead of $\lambda_{12}$ or $\lambda_{13}$ as per Eq. (5), $\lambda_{23}$ or the corresponding reciprocal values. As furthermore, the mixture stream is known if the fuel and exhaust gas supply are known, it is sufficient to determine the reference values only for two arbitrary ones of the three streams of primary air, secondary air and mixture and to regulate the volume flow. Likewise, one of the two air streams can be replaced by the total air stream.

In the first computing stage, the reference values for $\lambda_{12}$, $\lambda_{13}$ and $\lambda_{23}$, respectively, $b_a$ and B are calculated according to functions of measurement values characterizing the operating condition (e.g., the engine speed n, the position $\alpha_p$ of the gas pedal and changes in time of these variables), where these functions are determined according to the family of characteristic curves of the internal combustion engine. This first stage can in general be designed so that the fit to the characteristic data of different internal combustion engine types can be made by entering appropriate parameters into corresponding reference value computers. In the second computing stage, which can be designed independent of the characteristics of the internal combustion engine and the reformed gas generator, the reference values for the volume flows $L_V$, $L_M$ and/or $L_G$ which belong to the dimensionless reference values $\lambda_{12}$, $\lambda_{23}$ and $\lambda_{13}$, respectively, and $b_a$ as well as for $A_R$ or $a_R$ are then calculated in accordance with the equations mentioned.

The calculations are derived for the mass flows, but volume flows must be regulated. If the volume flows are set approximately equal to the mass flows, the error committed will not be too great. However, more accurate values for the volume flows to be adjusted can be determined from the equations given above via a measurement of the temperature and the pressure of the intake air and by means of the known data for the specific gravity of the fuel and the suction air as well as their temperature dependence.

The control of the volume flows of the primary air ($L_V$), the secondary air ($L_M$), the total air ($L_G$) or the mixture and, if applicable, the exhaust gas can advantageously be accomplished by measuring the actual values of the volume flows and forming the control deviation from the reference values determined in the second stage. This purpose is served by a closed control loop which controls suitable dosing devices for the volume flows, for instance, a throttling device in the primary air feed and the damper in the intake line (which may be arranged, for controlling the mixture stream, immediately at the inlet of the internal combustion or, for controlling the secondary air stream, in the secondary air feed) in such a manner that the control deviation vanishes.

Preferably, the first stage comprises a first reference value computer for the fuel supply B and a second reference value computer for the dimensionless quantities $\lambda_{12}$, $\lambda_{13}$ (or $\lambda_{23}$) and $b_a$. The output signal of the first reference value computer controls, on the one hand, a fuel pump and is fed, on the other hand, to the second reference value computer and to the second stage. The first reference value computer then determines the fuel supply B; the second reference value computer determines the reference values for $\lambda_{12}$, $\lambda_{13}$ and $b_a$ as a function of the calculated value of B; and the second stage determines the required volume flows from B, $\lambda_{12}$, $\lambda_{13}$ and $b_a$.

Advantageously, measurement values are fed to the first reference value computer for determining B, which correspond to the engine speed n and the gas pedal position $\alpha_p$. However, the speed and the control deviations of $L_M$ or $L_V$ can be fed in, while the throttle is opened in accordance with the gas pedal position. If in this case, the gas pedal is pushed through from zero (negligible fuel supply, negligible reference values for the air numbers and the air streams,—the internal combustion engine is kept running, for instance, by the starter battery), then the actual values for the air streams increase, while the reference values which are calculated from the initially still small fuel supply, are held back. According to the control deviation for $L_M$ or $L_V$, the reference value computer for B calculates increasing values and regulates increased fuel supply. If, finally, the control deviation disappears or changes its sign, the fuel supply is not increased further or is taken back slightly.

If the throttle is arranged directly at the inlet of the internal combustion engine, then the underpressure throttled thereby is distributed over the primary air line and the secondary air line according to the flow resistances in the two lines. If the flow resistance in the secondary air line exceeds the flow resistance in the reformed gas generator, for instance, if a (fixed) choke point is arranged in the secondary air line, then one can decrease the primary air, for instance, by closing a throttling device in the primary air line, and increase the secondary air without needing a separate throttling device in the secondary air line. Together with the throttle, one therefore obtains an indirect secondary air control by controlling the primary air and the mixture flow. The throttling device can, of course, also be arranged in the secondary air line in order to regulate the primary air indirectly thereby. However, the reaction chamber and, if applicable, the heat exchangers of the gas generator represent a buffer volume which makes such indirect primary air control relatively sluggish. Advantageously, the primary air and the secondary air are controlled separately via throttling devices of their own and the mixture is controlled via the throttle (damper), whereby the control range of the individual throttles becomes smaller and the control more accurate.

It is further advantageous to form, for controlling the secondary air stream, a reference value for the pressure drop in the primary air line or the secondary air line corresponding to the reference value of the primary air stream and to compare it with the corresponding actual value of the pressure drop. The throttling device in the secondary air line is then adjusted until the control deviation (difference between actual value and reference value) disappears.

The mixture stream or the total air $L_G$ can advantageously be controlled by comparing the reference value for the sum $L_V + L_M$ with the corresponding actual value and adjusting the throttle at the inlet of the internal combustion engine until the difference between the actual value and the reference value disappears. In case of load changes, especially when the fuel supply B is changed, it is advantageous to change the primary air number for a short time in accordance with the change in time of B from the steady state condition. If, for instance, the gas pedal is pushed down all the way, the fuel supply is increased in step fashion and at the same time, $\lambda_{12}$ and therefore, the primary air stream $L_V = \lambda_{12} \cdot B$ is temporarily increased, so that the gas generator is flushed through better and the reformed gas production follows the suddenly increased fuel gas demand of the internal combustion engine.

It is furthermore advantageous to also control, besides the streams of fuel, primary air, secondary air and, if applicable, exhaust gas, the ignition angle as a function of the operating data and the family of characteristic curves of the internal combustion engine. For this purpose, a further reference value computer for the ignition angle is provided in the first stage.

DETAILED DESCRIPTION OF THE INVENTION

Figure 1:
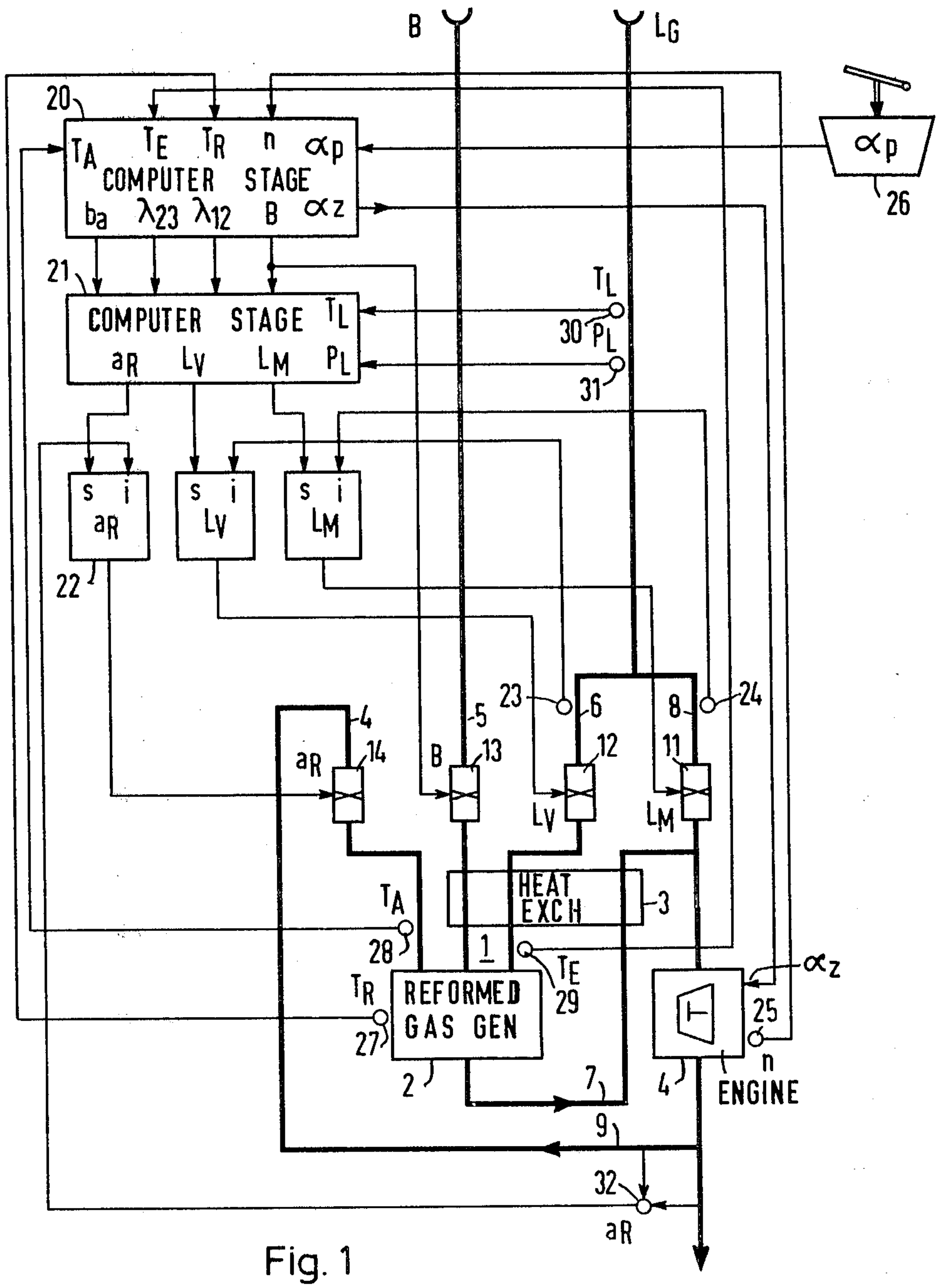
FIG. 1 is a block diagram of a first embodiment of a control system according to the present invention.

FIG. 1 shows the system consisting of a reformed gas generator 1 and an internal combustion engine 4 (for instance, a reciprocating engine of a motor vehicle). Such a reformed gas generator is described, for instance, in the German Offenlegungsschrift No. 2 558 922 and in the German Patent Application No. 2 614 670 and usually consists of a reaction chamber 2 containing a catalyst and a heat exchanger 3 for the reformed gas to be cooled on the one hand, and liquid fuel to be evaporated and/or primary air, on the other hand. Liquid fuel is fed into the reformed gas generator via a fuel feed 5 and primary air via a primary air feed 6. The reformed gas produced is fed via a reformed gas line 7 into the intake line of the internal combustion engine and is mixed with the secondary air coming from the secondary air feed 8. The mixture is burned in the internal combustion engine and the exhaust gas produced can, if desired, be returned in part via an exhaust gas return 9 to the reformed gas generator. The volume flows distinctly emphasized in FIG. 1 are controlled by a throttle 11 in the suction line, a throttling device 12 in the primary air feed, a controllable fuel injection device 13 in the fuel feed and, optionally, an exhaust gas dosing valve 14 in the exhaust gas line.

For controlling the dosing devices 11 to 14, an electronic control device which consists of two reference value computer stages 20 and 21 and forms reference values for the primary air stream $L_M$, the secondary air stream $L_V$, the exhaust gas portion to be returned $a_R$, the fuel supply B and, advantageously, also for the ignition angle $\alpha_z$ is used. The reference values for B and $\alpha_z$ can be used directly for controlling the fuel pump and the ignition angle at the ignition distributor of the internal combustion engine, while the reference values for $L_V$, $L_M$ and $a_R$, together with the actual values of these variables, are fed into closed control loops which control the dosing devices 11 to 14 in such a manner that the control deviations formed in the difference formers 22 of the control loops vanish.

For measuring the actual values for the volume flows, known flow measuring devices 23, 24, 32 can be used. For larger flow rates, for instance, for the secondary air, such devices are commercially available and are already used in the gasoline injection control for motor vehicles known under the name "L-Jetronik". For smaller volume flows, especially the primary air stream, a flow measuring device with a resistor arrangement depending on the magnetic field is suitable, such as is described in the German Offenlengungsschrift No. 24 34 964. These flow meters are designed so that they deliver output signals which are proportional to the quantity of gas flowing through the measurement point per unit time.

As input variables of the electronic control devices, signals for the engine speed n and the gas pedal position $\alpha_p$ existing for the respective operating conditions are required. This purpose is served by a sensor 25 at the internal combustion engine, e.g., at the distributor points, and a measuring transducer 26 which converts the gas pedal position into a corresponding electrical signal, for instance, a potentiometer, the slider of which is coupled mechanically to the gas pedal. Since a lowering of the reactor temperature of the reformed gas generator can be effected by an increase of the exhaust gas return, it is further advantageous to measure the reactor temperature $T_R$ by means of a temperature sensor 27 and to feed it as input into the first stage 20 for computing the reference value for $b_a$. It may also be useful to measure the temperature of the substances (fuel and/or air) heated in the heat exchanger 3 by means of a temperature sensor 29. It is also advantageous to determine the exhaust gas temperature, which fluctuates heavily depending on the load condition of the internal combustion engine, by means of a temperature sensor 38 and to feed it likewise into the first stage. From these quantities, the reference values for B, $\lambda_{12}$, $\lambda_{23}$ and $b_a$ are calculated in the first stage according to functions which are chosen in accordance with the family of characteristic curves of the internal combustion engine. Also deviations in time of these quantities, for instance, the change in time of the speed and/or the fuel supply, are taken into consideration when determining the functions according to the family of curves.

In the second stage 21, the reference values for $a_R$, $L_V$ and $L_M$ are formed from the stoichiometric relations explained above, which are independent of the family of characteristic curves. The second stage can be made as a fixed building block for many types of internal combustion engines. The conversion of the dimensionless numbers $\lambda_{12}$, $\lambda_{23}$ and $b_a$ into the corresponding reference values for the volume flows requires, in addition, only the specific gravity and the "air-fuel ratio" of the liquid fuel used in stoichiometric operation as well as the temperature and the pressure of the intake air, i.e., of the ambient atmosphere. In order to take these variables into consideration, a temperature sensor 30 and a pressure measuring device 31 can be arranged in the line for the intake air.

Figure 2:
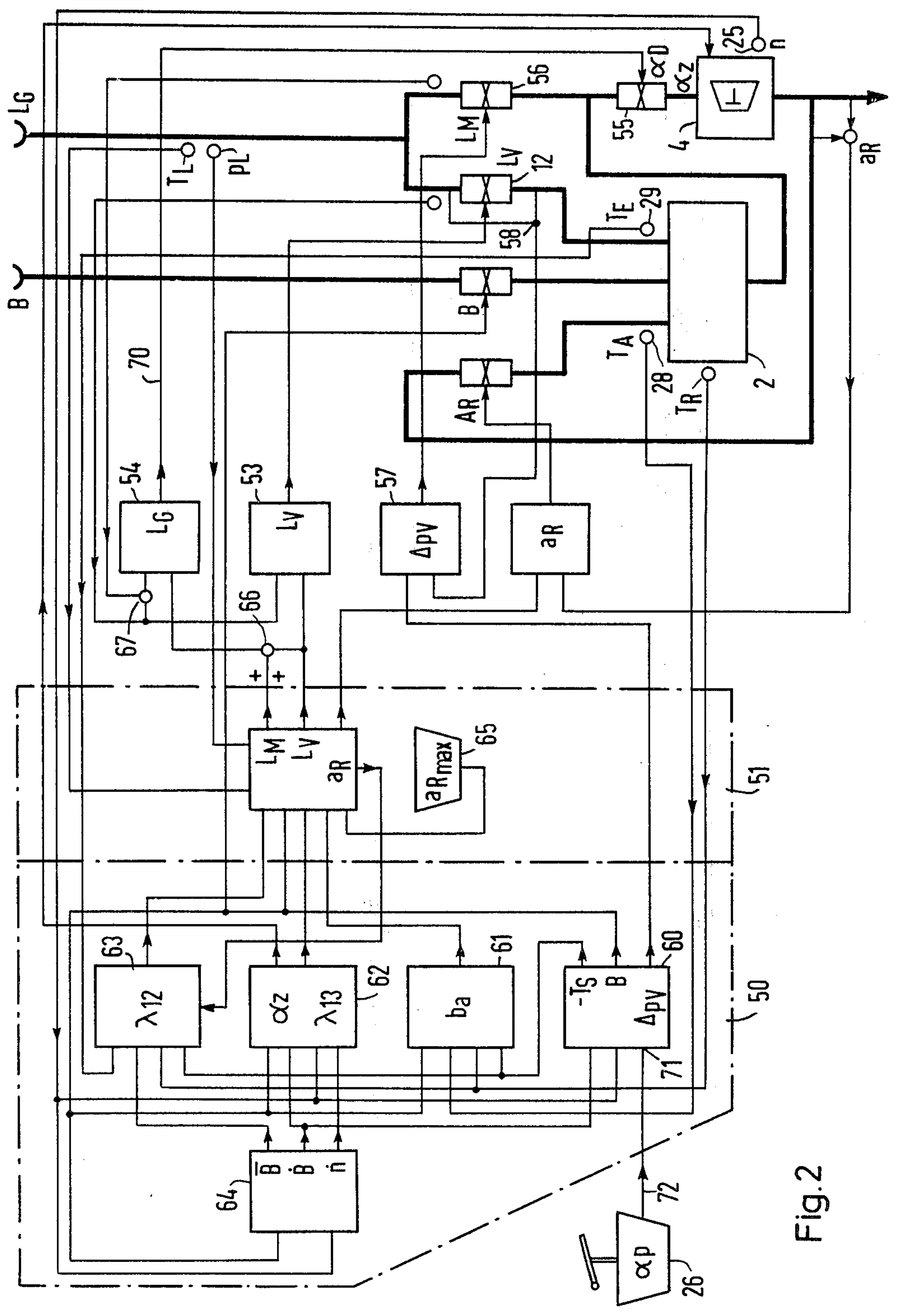
FIG. 2 is a similar diagram of a second embodiment of a control system according to the present invention.

The embodiment of the invention shown in FIG. 2 consists substantially of the same components with the same reference symbols. In the first stage 50 corresponding to stage 20 of FIG. 1, the reference value for the total air number ($\lambda_{13}$) is calculated, from which in the second stage 51 the reference values for the volume flows $L_G$ and $L_V$ are formed, instead of the reference values for the secondary air number ($\lambda_{23}$). The reference value for the primary volume flow $L_V$ is compared in a corresponding difference member of the difference former 53 with the actual value for $L_V$, to control, with the control deviation, the throttling device 12 of the primary air feed. The reference value for the total air ($L_M+L_V=L_G$) is used to control a dosing device where the sum of the measured actual values for $L_M$ and $L_V$ is formed in the adder 67, i.e., a summing junction, and is compared with the reference value $L_G$ in a difference former 54. The control deviation obtained is used to control the position $\alpha_D$ of the throttle 55. This throttle is arranged in this embodiment not in the part of the suction line carrying secondary air (secondary air feed), but in the part carrying the reformed gas/secondary air mixture. Since the total air stream and the mixture stream are also determined unequivocally if $L_M$ and $L_V$ are known, the secondary air stream is regulated indirectly by control of the throttle 55 and the throttling device 12 alone.

In spite of this, a separate control of the secondary air stream by means of a second throttling device 56 arranged in the secondary air feed is provided in this embodiment. To control this second throttling device, a reference value adapted to the family of characteristics of the internal combustion engine for the underpressure in the suction line, produced by the suction of the internal combustion engine, is formed in the first stage 50 of the electronic control device from the position of the gas pedal and, optionally, taking into consideration other operating data (e.g., the change in time of the fuel flow). This reference value is compared in a further difference member 57 with the corresponding actual value, the control deviation being used for controlling the throttling device 56. In principle, the throttling device 56 could also be controlled corresponding to the reference value for $L_M$ formed in the second stage, whereby fine control of the volume flows $L_V$, $L_M$ and $L_G$ would be achieved, but the embodiment proposed here makes possible particularly fast load changes.

For, if the pedal is pushed down quickly all the way in case of the load change, then large reference values are calculated in the second stage for the primary air $L_V$ and the total air $L_G$. Accordingly, the first throttling device 12 and the throttle 55 are opened. The volume of the gas generator causes the reaction chamber and the heat exchanger to be sucked empty first, however. The actual value of the primary flow is consequently increased only gradually; the secondary air stream, however, follows the increase of the suction underpressure upstream of the throttle faster, so that in regulating the total air stream $L_G$ to the actual value, mainly the secondary air stream is increased at first. The mixture drawn is therefore leaned out, while the internal combustion engine has increased fuel demand just then. Since in this process, however, the underpressure in the suction line upstream from the throttle does not rise as fast, because of the buffer volume of the gas generator, as it should increase according to the opening of the throttle, the possibility is opened up to calculate the reference value for the suction underpressure and to open the second throttling device 56 only far enough so that the control deviation of the measured pressure drop from the calculated pressure drop nearly disappears. The secondary air stream is then accelerated less, while the air stream flowing through the gas generator is accelerated overproportionally and is increased. This makes fast load changes possible.

The pressure drop can be measured here by measuring the pressure difference before and after the throttling device 56 in the secondary air line. However, the throttling device 56 can advantageously be controlled also by measuring the pressure drop in the primary air line. For this purpose, a difference manometer 58 bridging the throttling device 12 is provided. This arrangement has the additional advantage that changes in the reformed gas generator (for instance, due to dirt), which would lead to an increase of the flow resistance in the reformed gas generator in the course of use and would reduce the primary air stream, are compensated automatically. For, in this case, the pressure drop at the throttling device 12 falls, which results in that the second throttling device 56 in the secondary air line is closed to the same degree, so that the desired ratio of primary air to secondary air is preserved.

In such an arrangement, the throttle 55 at the inlet of the internal combustion engine could in principle be dispensed with. Then, however, the entire range of the suction underpressure between about 0.6 bar when idling and approximately 0 at full load would have to be controlled by the two throttling devices 12 and 56, which makes fine control of the primary air particularly difficult.

The first stage is constructed from four computer modules 60 to 63 and a dynamics member 64, which will be explained in greater detail in the following.

Figure 3:
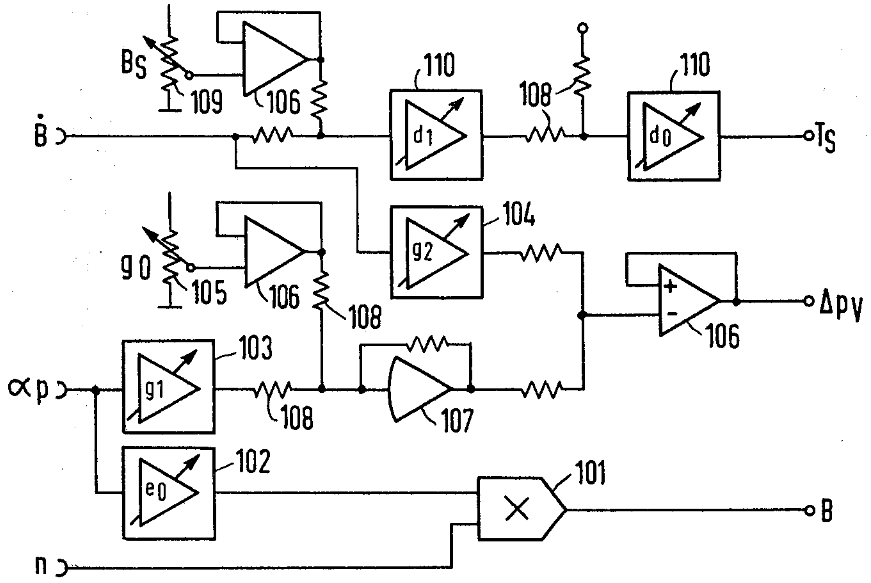
FIG. 3 is a block/circuit diagram of a first reference value computing module for computing the reference value for the fuel supply in the first computing stage of FIG. 2.

We shall begin with module 60 for computing the reference value for the fuel supply B, the design of which is shown in FIG. 3. For controlling the engine power, the gas pedal, the position of which is determined by a voltage signal $\alpha_p$ proportional to the desired load of the measuring transmitter 26 is fed in and used. For the dependence of the fuel supply B, the function $$B=e_o.n.\alpha_p$$

is determined, where $e_o$ is a settable proportionality factor. A voltage signal which is generated by the transmitter 25 and is proportional to the speed n, is fed, together with $\alpha_p$, to a multiplier 101. In the line for $\alpha_p$, an amplifier 102 with adjustable gain is provided for realizing the proportionality factor $e_o$.

The reference value for the pressure drop $\Delta p_v$ in the primary air line is composed of a constant base value $g_o$ which, for instance, represents the pressure drop in the reformed gas generator, and a term which is proportional to the suction in the intake line. The functional dependence $$p_v=g_o+g_1\alpha_p-g_2\dot{B}$$

is chosen. $\dot{B}$ is a voltage signal for the change in time of the fuel supply, obtained by differentiating the reference value B in the dynamics member 54. The variable $\dot{B}$ is taken into consideration in view of the load change and has the effect that in the event of a sudden load change which is accompanied by a sudden change in the fuel supply, the reference value for the pressure drop is changed for a short time and the secondary air is thereby controlled in such a manner that the secondary air stream is temporarily throttled relative to the primary air stream in the event of a load increase and the mixture is made richer. $g_1$ and $g_2$ are proportionality factors which can be predetermined in accordance with the family of characteristic curves of the system and are taken into consideration by respective amplifiers 103 and 104 which are connected to the inputs for $\alpha_p$ and B. The voltages $g_1\,\alpha_p-g_2$ B and the base value $g_o$, which is taken off at a pontentiometer 105, are added, for which purpose further amplifiers for impedance matching (106) and for the adding circuit (107) and resistors (108) are required.

In addition, a reference value $T_S$ for the reactor temperature is computed in the computing module 60. For this purpose, the function $$T_S=d_o\{1+d_1(\dot{B}-\dot{B}_S)\}$$

is chosen, which is required for calculating $b_a$ and $\lambda_{12}$ and therefore, for regulating the reactor temperature. This function has the effect that under steady stage conditions ($\dot{B}=0$) the reactor temperature $d_0-d_0.d_l.\dot{B}_S$ prevails, where $d_0$, $d_1$ and $\dot{B}_S$ are variable constants which are adapted to characteristic data of the reformed gas generator. If the fuel throughput is increased rapidly, the reactor temperature is increased and it is decreased if the fuel throughput is decreased. $-\dot{B}_S$ can again be set and taken off at a potentiometer 109; $d_1$ and $d_2$ are generated by appropriate variable amplifiers 110.

In the operation of an internal combustion engine with a reformed gas generator, feedback of the exhaust gas to the reformed gas generator can in general be dispensed with, which simplifies the apparatus required considerably. Since, however, endothermic processes occur besides exothermic processes in the reformed gas generator if the primary air is partly replaced by exhaust gas, the exhaust gas feedback can be used for effectively controlling the reactor temperature. This is especially advantageous if the reactor contains temperature sensitive catalysts. The computer module 61 (FIG. 2) is provided for this purpose, which computes the reference value for the fraction $b_a$ of the primary air to be replaced by exhaust gas as a function of the measured value $T_R$ of the reactor temperature. In the embodiment example shown in FIG. 2, this module has, besides the input for $T_R$, one input each for the reactor reference temperatures $T_S$ and the reference value of the fuel supply B, which are connected to the corresponding outputs of module 61, and for the measured value of the exhaust gas temperature sensor 28. The reference value is calculated so that $b_a=0$ applies if the reactor temperature $T_R$ is lower than the reference temperature $T_S$. For higher temperatures, $b_a$ is calculated proportional to the difference $T_R - T_S$. In addition, the exhaust gas feedback can be increased if the exhaust gas has a high temperature and carries along part of the necessary reaction heat. It can also be taken into consideration that with a large fuel supply, the reaction must also be so strongly exothermic that the large quantity of fuel fed in is evaporated when fed into the reformed gas generator. Therefore, the reference value for $b_a$ is calculated according to the functional relation $$b_a = 0 \quad \text{for } T_R < T_S$$

$$b_a = c_o(T_R - T_S)[1 + c_1(T_A - T_{Ao})][1 - c_2(B - B_o)] \quad \text{for } T_R \geqq T_S$$

Here, $c_o$, $c_1$, $c_2$, $T_{Ao}$ and $B_o$ are parameters which are chosen in accordance with the characteristic data of the reformed gas generator.

Figure 4:
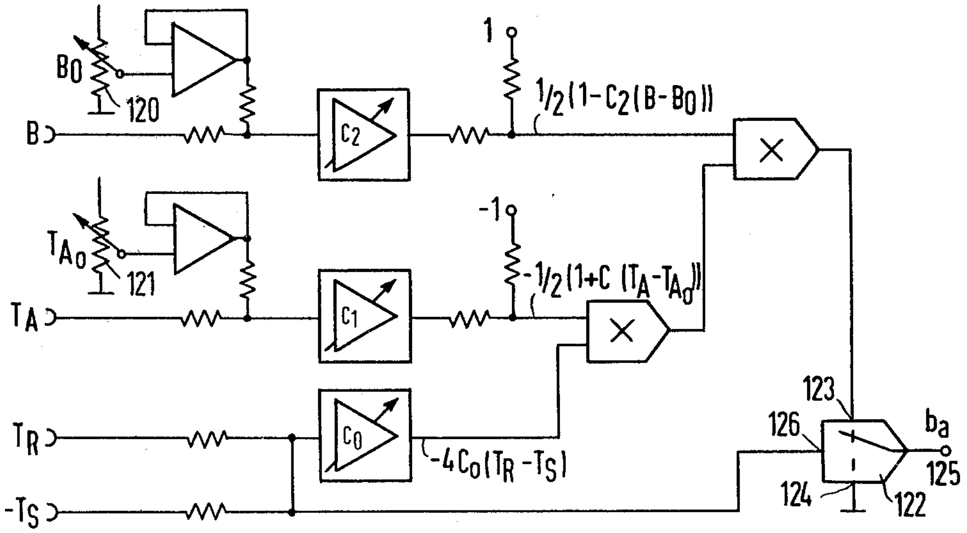
FIG. 4 is a similar diagram of the computing stage for computing exhaust gas feedback.

FIG. 4 shows schematically the circuit diagram of a module of this kind, which has inputs for the voltage signals $T_R$ and $T_A$ formed in the temperature sensors 27 and 28, as well as for the reference values $T_S$ and B calculated in the module 60. $B_o$ and $T_{Ao}$ are taken off at potentiometers 120 and 121 as variable voltages. A logic switch 122 connects one of the two inputs 123 and 124 to the output 125. If the signal $(T_R - T_S)$ present at the input 126 is positive, the input 123 is connected to the output in the manner shown in the symbol.

A further module 62 serves for computing the reference value for $\lambda_{13}$. This air number is set so that the composition of the exhaust gas is optimized as to its content of nitrogen oxides, partially burned hydrocarbons and other noxious substances. In general, it can only be required that $\lambda_{13} > 1$; the exact reference value must be computed considering the combustion properties of the internal combustion engine. The steady stage behavior of the internal combustion engine can be taken into consideration sufficiently if $\lambda_{13}$ is chosen in dependence on the gasoline supply and the speed proportional to a polynomial, into which these variables enter up to the third power. In general form, this polynomial can be written $$P_L(n, B) = \sum_{i,j=0}^{3} b_{ij}\, n^i B^j$$

with 16 parameters $b_{00}$, $b_{01}$, $b_{10}$, . . . $b_{33}$, which can be set for adaptation to the family of characteristic curves of the internal combustion engine. So that the air number can also be adapted to load changes, the function $$\lambda_{13} = P_L(n, B) \cdot \left(1 + b_{17}\frac{\dot{n}}{n} + b_{18}\frac{\dot{B}}{B}\right)$$

is proposed for the reference value of the air number $\lambda_{13}$, where $b_{17}$ and $b_{18}$ can likewise be selected for adaptation to the family of characteristic curves of the internal combustion engine.

Figure 5:
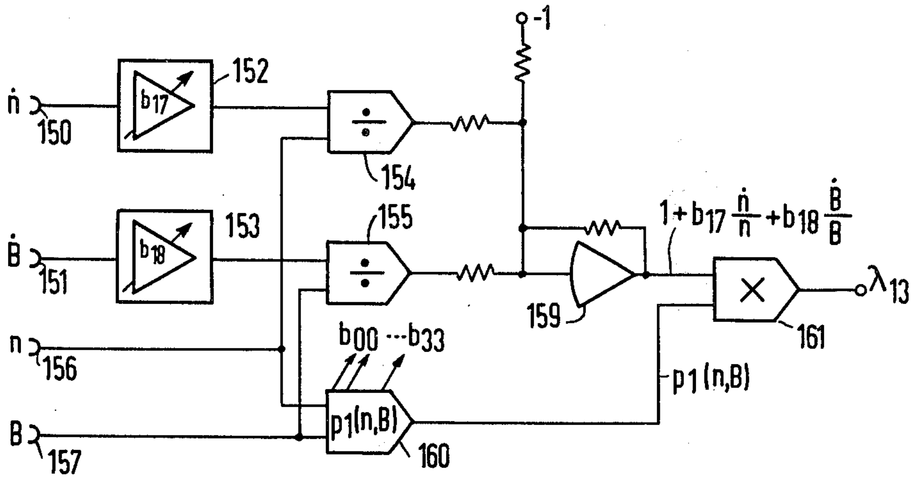
FIG. 5 is a similar diagram of a computing stage for computing an air number.

The circuit diagram of the computing module 62 is shown in FIG. 5. Inputs 150 and 151 for the derivatives of n and B with respect to time, which are formed by differentiation in the dynamics member 64, are fed via corresponding variable amplifiers 152 and 153 to the respective first inputs of dividers 154 and 155. The other inputs of these dividers are connected to inputs 156 and 157 for the voltage signals of n and B. The output signals of these dividers are added to a constant voltage taken from the power supply by means of the amplifier 159. Further, the inputs 156 and 157 are fed to a multiplier system 160, which may consist of amplifiers and multipliers and which permits setting the 16 freely predeterminable parameters $b_{00}$ and $b_{33}$ as multipliers. From the signals obtained, a voltage signal corresponding to the reference value is subsequently formed in the multiplier 161.

The exhaust gas composition and the engine output power are also essentially determined by the ignition angle $\alpha_z$, which can likewise be optimized as a function of the family of characteristic curves of the internal combustion engine, for which the functional relation $$\alpha_z = \sum_{i,j=0}^{3} (f_{ij}\, n^i B^j)\left(1 + f_{17}\frac{\dot{n}}{n} + f_{18}\frac{\dot{B}}{B}\right)$$

is chosen analogously. For realizing this relationship, a circuit can be used which is connected to the inputs 150, 151, 156 and 157 and is designed analogously to the arrangement according to FIG. 5.

In a further computing module 63 of the first stage, finally, a suitable reference value for the primary air $\lambda_{12}$ must be calculated for each load condition (i.e., for each B value). In order to avoid hunting of the system, it is advisable to calculate $\lambda_{12}$ as a function of a time average $\overline{B}$, which is formed in the dynamic member. If the fuel supply is in the medium range, i.e., between two predeterminable fuel supplies $\overline{B_1}$ and $\overline{B_2}$, then $\lambda_{12}$ can be chosen independently of the fuel supply. For smaller conversion rates, however, the air number must be increased, i.e., the reaction must be directed more exothermically in order to compensate heat losses in the reactor and to avoid the formation of soot. It can be further advantageous to increase the air number for large fuel throughputs in order to supply the heat of evaporation for the increased fuel supply through an increase of the reaction heat. The air number $\lambda_{12}$ is therefore calculated proportional to a quantity $h_o$, for which applies:

$$h_o = a_o - a_1(\overline{B_1} - \overline{B}) \quad \text{for } \overline{B} < \overline{B_1}$$

$$h_o = a_o \quad \text{for } \overline{B_1} \leqq \overline{B} \leqq \overline{B_2}$$

$$h_o = a_o + a_2(\overline{B} - \overline{B_2}) \quad \text{for } \overline{B} > \overline{B_2}$$

It may further be advantageous to reduce the air number at higher entrance temperatures of the primary air. For this purpose, the temperature $T_E$ of the mixture of primary air and evaporated fuel is measured by means of the temperature sensor 29 at the inlet of the internal combustion engine, i.e., after leaving the heat exchanger 3 (FIG. 1). For, at high temperatures $T_E$ a smaller heat effect of the reaction, i.e., a lower primary air number, is necessary to maintain the operating temperature of the reactor. While the operating temperature of the reformed gas generator can be regulated via the exhaust gas feedback, as already mentioned, it will frequently not be advantageous for the catalytic conversion in the reactor to replace too large a part of the primary air by exhaust gas. For this reason, a limit indicator is provided, as will be explained later, which delivers a signal GW to the first stage when a maximum value $a_{R\,max}$ for the exhaust gas feedback is reached or exceeded. This signal can, for instance, be positive if $a_{R\,max}$ is exceeded and otherwise, GW=0. GW>0 means that a further increase of the exhaust gas feedback is not possible. However, by reducing the primary air, the heat exchange effect of the reaction can be decreased and thereby, an approach of the reactor temperature to the reference temperature can be achieved. $\lambda_{12}$ will therefore be chosen proportional to a quantity $h_1$ $$h_1 = 1 - a_3(T_E - T_{Eo}) \quad \text{for } GW = 0$$

$$h_1 1 - a_3(T_E - T_{Eo}) - a_4(T_R - T_S) \text{ for } GW > 0$$

so that one obtains $$\lambda_{12} = h_o \cdot h_1.$$

Figure 6:
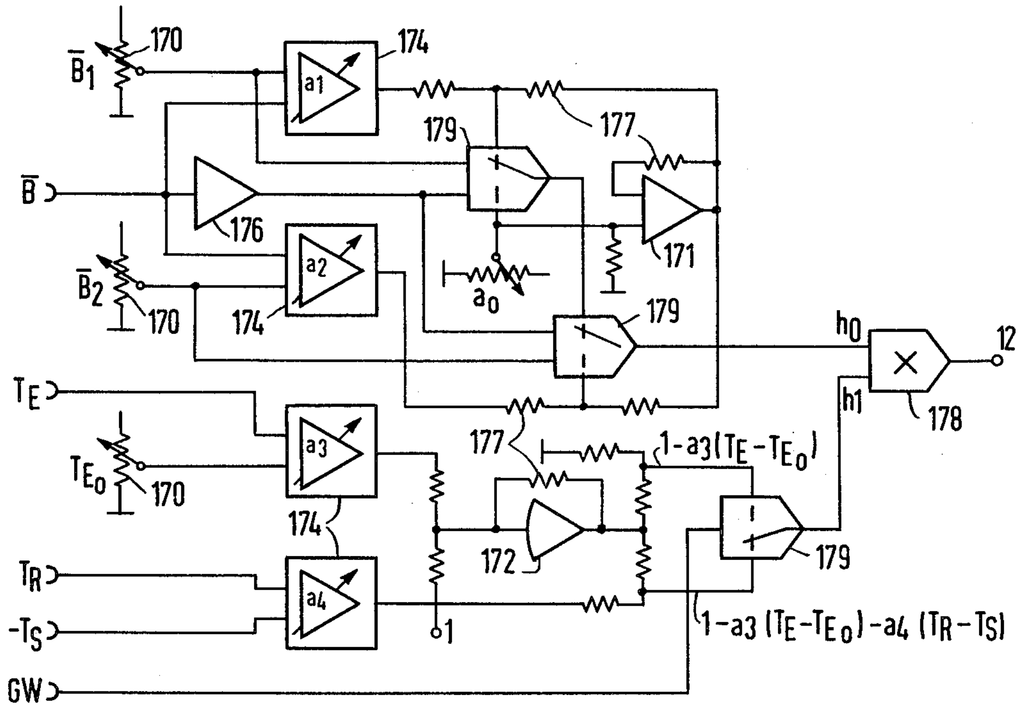
FIG. 6 illustrates another module for computing an air number.

FIG. 6 shows how the module, which has inputs for B, $T_E$, $T_R$ and $T_S$, can be constructed from potentiometers 170, amplifiers 171 and 172, amplifiers 174 with adjustable gain, an amplifier 176 connected as an inverter, resistors 177, a multiplier 178 and logic switches 179 according to DIN 40 700-18-34.

Figure 7:
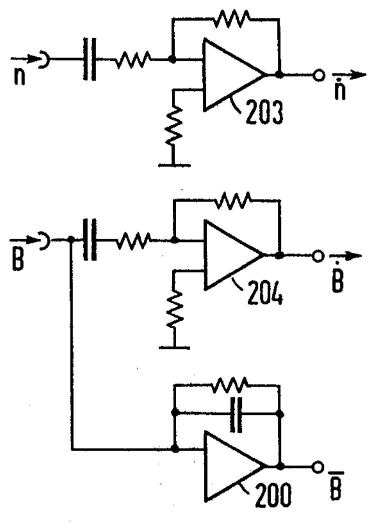
FIG. 7 is a schematic diagram of the dynamics module of the present invention.

In order to feed the voltage signals corresponding to the variables $\dot{n}$, $\dot{B}$ and $\bar{B}$, to the computing modules 60, 62 and 63, a dynamics module is required. As FIG. 7 shows, this module contains an amplifier 200 which is connected in the conventional manner and is additionally shunted by a capacitor to form an integrator and the input of which is connected to the output of the first reference value computer 60 carrying the reference value B. At the output of the amplifier, a voltage signal is then produced which has a smooth shape of the fuel supply reference curve. For forming the variables $\dot{n}$ and $\dot{B}$, the measurement value sensor 25 for the speed and the input for the reference value B are each connected to the input of a differentiating member 203 and 204, respectively. At the outputs, voltage signals are then present which correspond to the values $\dot{n}$ and $\dot{B}$.

For calculating the volume flows in the second stage, the quantity of air L required for the stoichiometric combustion of the amount of fuel B to be fed in must be calculated first. Taking into consideration the measured values for the pressure $P_L$ and the temperature $T_L$ of the intake air, one can write in approximation for "straight-run" gasoline $$L = 9.084 \cdot B \cdot \frac{770 \text{ Torr}}{P_L} (1 + 2.26 \times 10^{-3} T_L - 20^\circ \text{ C.}) \text{m}^3/\text{l}.$$

Figure 8:
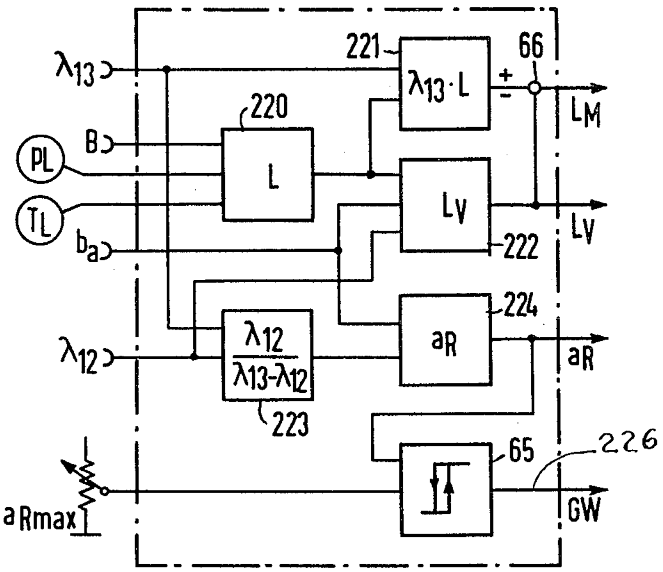
FIG. 8 is a block diagram of the second computing stage for computing mass flows.

For computing this function, a computing module 220 (FIG. 8) with inputs for $T_L$, $P_L$ and B, the output of which leads to a multiplier 221, in which the signal for L is multiplied by the reference value $\lambda_{13}$ taken from the module 62 is used.

For computing the primary air stream according to the formula $$L_V = L(1 - b_a)\lambda_{12}$$

a computing module 222 with inputs for the reference values $\lambda_{12}$ and $b_a$ taken from the first stage, and the value L calculated in the module 220 is used. In the subtraction member 66, the reference value $L_M = L_G - L_V$ for the secondary air stream is formed from the signals of the modules 221 and 222.

A computing module 223 which is connected to the signal lines for $\lambda_{12}$ and $\lambda_{13}$, is used for computing $\lambda_{12}/(\lambda_{13} - \lambda_{12})$. The corresponding quantity and the reference value $b_a$ calculated in the first stage are fed to a computing module 224, in which the returned exhaust gas fraction $a_R$ $$a_R = A_R/A = \lambda_{12} \cdot b_a / (\lambda_{13} - \lambda_{12})$$

is calculated.

In addition, the signal GW must be generated in the limit indicator 65. For this purpose, the reference value $a_R$ and the adjustable limit $a_{R\ max}$ are fed to the limit indicator. The two values are compared with each other and for $a_R > a_{R\ max}$, a constant positive voltage is generated at the output 226. For $a_R \leqq a_{R\ max}$ the output 226 is grounded.

Figure 9:
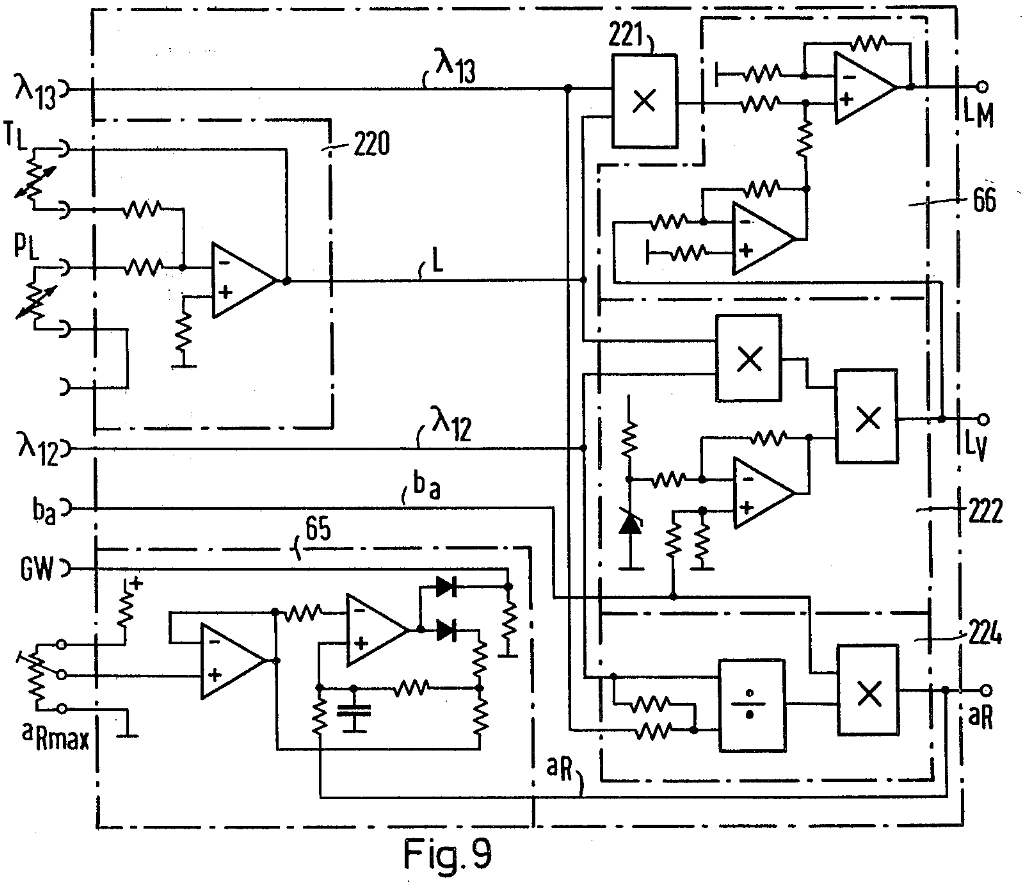
FIG. 9 is a more detailed schematic/block diagram of the second computing stage.

FIG. 9 shows the design of the second stage which is laid out for internal combustion engines with a maximum throughput of 24 l of gasoline per hour. Since the characteristics of the internal combustion engine have no further influence on the processes of the second stage, the stage can have the same design for all internal combustion engines of this size.

The first stage, on the other hand, is designed to be variable in such a manner that it can be adapted to very different families of characteristics. This variability is of advantage particularly when the final optimization of the volume flows to be regulated is not yet set. The apparatus is especially suitable for determining the adaptation to the family of characteristics of given internal combustion engines experimentally by varying the individual parameters. If the functional relationships which must be taken into consideration in the first stage are set once for an internal combustion engine type, then one can dispense, of course, with the many possibilities of adaptation and intervention in the first stage. The individual parameters can then be built into the circuit as fixed quantities, which can be manufactured, for instance, by integrated circuit techniques. The circuit which was proposed here in analog logic, can also be built up in digital logic. Microprocessors can also be used to advantage.

In many cases it will be possible to operate with an approximately constant total air number $\lambda_{13}$. Since the fuel supply as well as the total air stream or the mixture stream are then to be regulated approximately proportional to the position of the gas pedal, the gas pedal position can be used, not only for controlling the fuel pump 13, but also directly for driving the throttle 55 and the difference former 54, respectively.

The apparatus according to FIG. 2 can also be modified so that the line 70 coming from the difference former 54 is not connected to the throttle 55 but to the input 71 for $\alpha_p$ of the first reference value computer 60. The line 72 coming from the gas pedal sensor 26, on the other hand, is not connected to the input 71 but to the throttle 55. The gas pedal then controls the throttle 55 directly. The reference value computer 60 forms a reference value for the fuel supply which serves, as before, for controlling the fuel pump 13 on the one hand, and on the other hand, for forming a new "reference value" for the total air stream and thus for forming a new control deviation, which is fed back into the reference value computer 60. This creates negative feedback which regulates, for each total air stream, the corresponding fuel supply belonging to the air number $\lambda_{13}$. The same variant of the method can also be carried out if (for instance in the apparatus according to FIG. 1), the secondary air stream replaces the total air stream.

Figure 10:
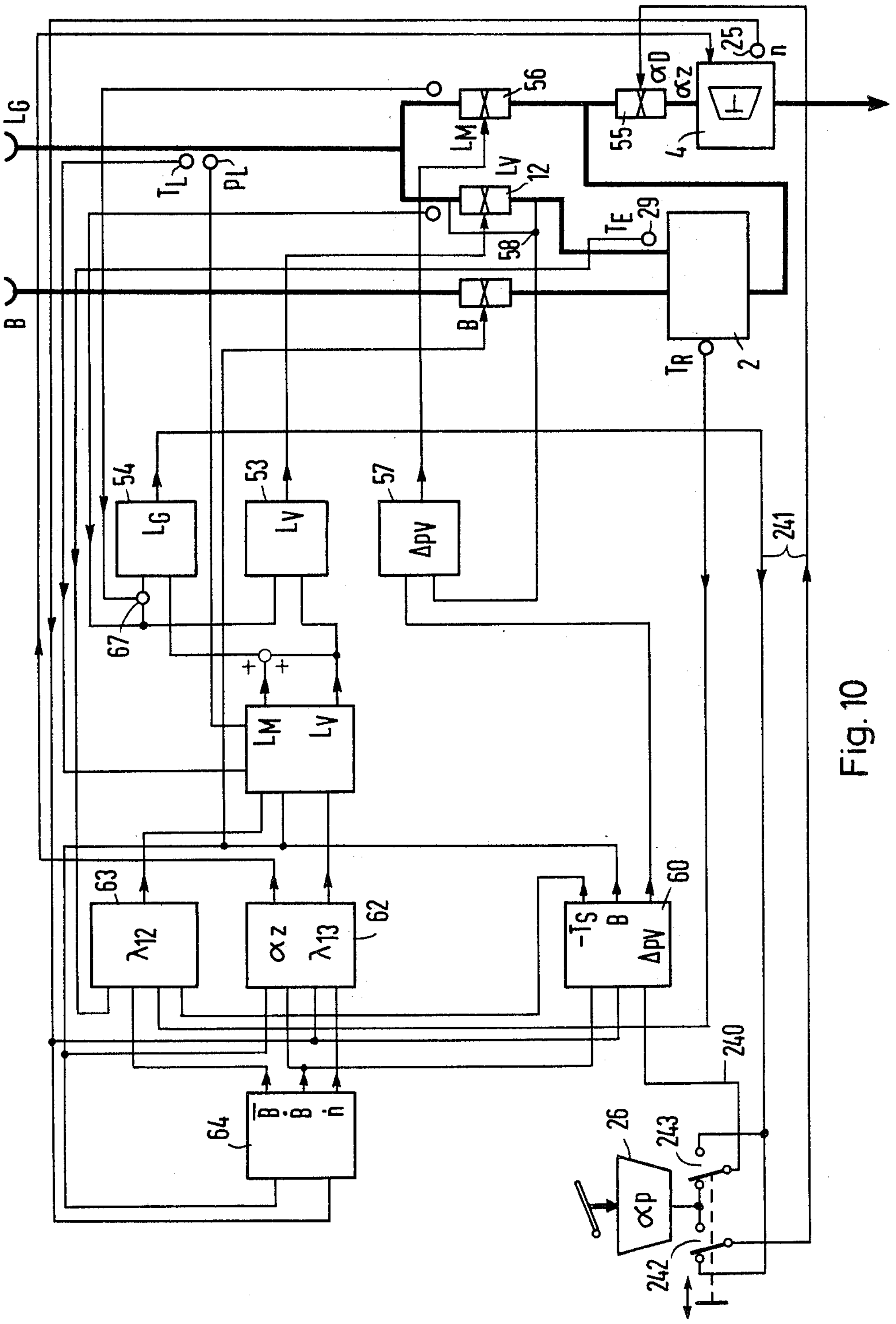
FIG. 10 is a block diagram of a further control system according to the present invention.

These variants of the method can be implemented in apparatus according to FIG. 10, where exhaust gas feedback is not provided.

In this figure, there are arranged in the line 240 leading from the gas pedal sensor 26 to the first reference value computer 60 and in the line 241 leading from the difference former 54 to the throttle 55, two switches 242 and 243, which are coupled to each other. In the position of these switches shown in FIG. 10, the measured value for the gas pedal position is entered into the computer 60 for calculating the reference value for the fuel supply, while the control deviation for the mixture stream $L_G$ serves to control the throttle. In this position, the method is therefore carried out in the manner described in detail above.

If the switches 242 and 243 are switched over, however, then the gas pedal signal is used directly for controlling the throttle. The control deviation of the total air stream $L_G$ on the other hand is fed into the first reference value computer 60 and utilized there instead of the gas pedal position for calculating the reference value for the fuel supply B, the desired reactor temperature $T_S$ and the pressure drop $\Delta p_v$.

Rapid load changes are also made possible with this control, particularly by increasing the reactor reference temperature in the event of a rapid rise in the time of the reference value B for the fuel supply, as indicated above. This has the effect that the reactor temperature $T_R$ initially lags behind the increased reference temperature $T_S$, which leads to an increase of the reference value $\lambda_{12}$ and, as the total air number $\lambda_{13}$ is set independently thereof, to a lowering of the secondary air number. In the second stage, corresponding reference values for the volume flows are calculated therefrom, and the control loop finally results in the first throttling device 12 in the primary air feed being opened more and the second throttling device 56 in the secondary air line being throttled. This leads to better flushing of the reformed gas generator with primary air and to a rise of the reformed gas production corresponding to the load change.

The term $-g_2.\dot{B}$ has a similar effect in calculating the reference value for $\Delta p_v$, i.e., that upon a sudden increase of the fuel supply, a lower reference value for the pressure drop of the primary air line is calculated. To make the control deviation of this pressure loss disappear, the second throttling device 56 in the secondary air line is throttled, which would lead to a reduction of the secondary air stream. This would at first decrease the total air stream which, however, is regulated by a reference value independent of $\dot{B}$. Therefore, the throttle 55 is opened simultaneously and the suction in the reformed gas line is increased thereby. Overall, the primary air stream and the secondary air stream are thus increased, but the ratio of the two streams is temporarily shifted in favor of the primary air stream.

Figure 11:
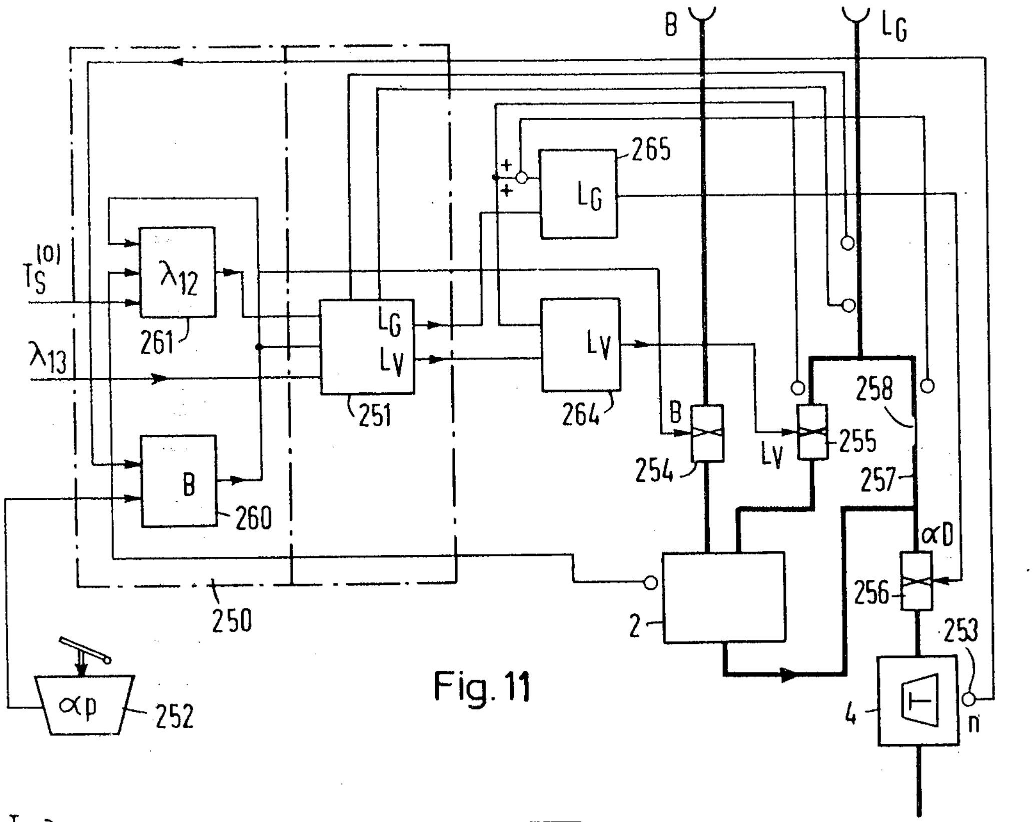
FIG. 11 is a block diagram of an embodiment of an additional control system according to the present invention.
Figure 12:
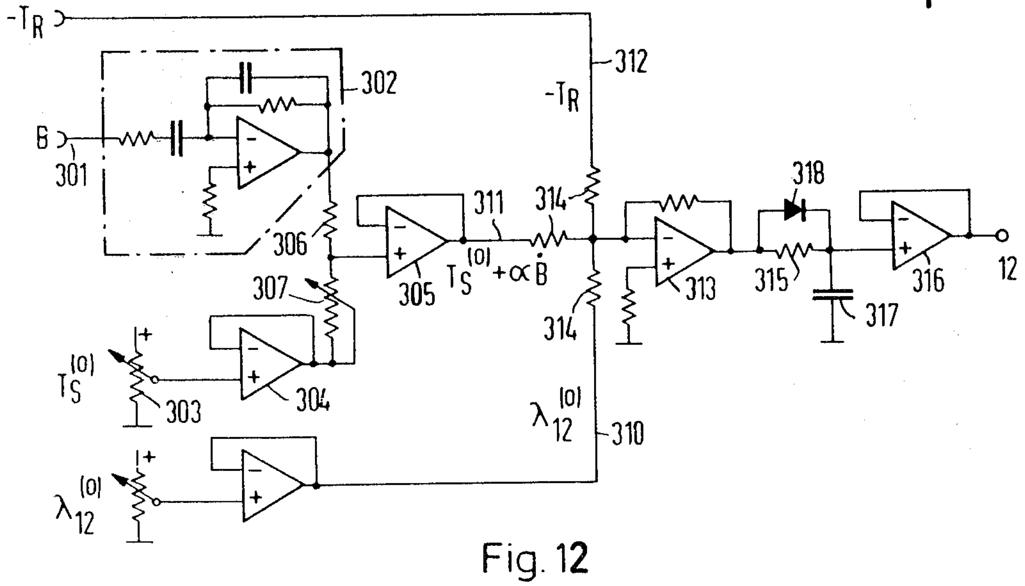
FIG. 12 is a schematic diagram of a simplified form of second reference value computer.

In many cases, the general embodiments shown in FIGS. 2 to 10 can be simplified. Apparatus simplified in this manner is shown in FIGS. 11 and 12. Measured-value transmitters 253 and 252 for the gas pedal position and the engine speed are provided, from the signals of which the reference value for the gasoline supply $$B=e_o.n.\alpha_p$$

is formed in the first reference value computer 260 of the first computing stage 250. The fuel flow is regulated by the fuel dosing device 254 proportional to the reference value signal for B. The reference value signal for B is further fed to a second reference value computer 261.

This second reference value computer (FIG. 12) is designed so that the voltage signal which is proportional to B and is present at the input 301 is fed to an amplifier 302, which is connected as a differentiator with R-C members, to form $\dot{B}$.

Operation with constant reactor temperature, except for temperature variations during load changes, is frequently advantageous. Therefore, the temperature reference value $T_S^{(o)}$ for steady state operating conditions is set fixed into the reference value computer by the position of the slider of a potentiometer 303 which is connected to a constant voltage. The voltage tapped off is fed via an amplifier 304 (impedance transformer) together with the output of the amplifier 302, to the one input of an amplifier 305; for forming the sum $T_S^{(o)}+\alpha\dot{B}$ (with $\alpha$ as a predeterminable parameter which can be adapted to the characteristic data of the internal combustion engine), the signal $\dot{B}$ is conducted via a resistor 306 and the signal $T_S^{(o)}$ is conducted via a variable resistor 307. Thus, a temprature reference value is now formed which is changed according to the derivative $\dot{B}$ with respect to time of the fuel supply if the fuel supply is changed, relative to the temperature reference value $T_S^{(o)}$ matched to the steady state operating conditions.

For the primary air $\lambda_{12}$, the reference value for the temperature control is now calculated so that a dropping of the reactor temperature by an increase of the air number is counteracted, but otherwise, $\lambda_{12}$ is held at a constant value $\lambda_{12}^{(o)}$. For this purpose, the predeterminable value $\lambda_{12}^{(o)}$ is again taken off at a potentiometer 308, while the actual value $T_R$ of the reactor temperature can be fed in, for instance, as a negative voltage drop taken off at a resistance thermometer. The lines 310, 311, 312 for $\lambda_{12}^{(o)}$, $T_S^{(o)}+\alpha\dot{B}$ and $-T_R$ are connected to the input of an adder consisting of the resistors 314 and the amplifier 313. The added output is fed via a resistor 315 to the input of a further amplifier 316; the input is grounded via a capacitor 317 and the resistor 315 is shunted by a diode 318. The conduction direction of the diode points from the amplifier 313 to the amplifier 316 if the output signal of the amplifier 313 is positive for increasing $\dot{B}$, as then, the input of the amplifier 316 is brought by the diode 318 to the output potential of the amplifier 313, and the reference value is calculated as:

$$\lambda_{12}=\lambda_{12}^{(o)}+(T_S^{(o)}+\alpha\dot{B})-T_R \quad \text{for } \dot{B} \text{ increasing}$$

In the other case, the voltage across the capacitor 317 decays at the input of the amplifier 316 with the time constant RC and the reference value is calculated as $$\lambda_{12}=\lambda_{12}^{(o)}+(T_S^{(o)}+\alpha\dot{B}\,e^{-t/RC})-T_R \quad \text{for } \dot{B} \text{ decreasing}$$

The output signal of the reference value computer 261 is now fed to the second computing stage 251, to which is further fed a constant reference value for the total air, adapted to the steady state operating conditions. This second computing stage is built from the computing modules 220, 221 and 222 (FIG. 8) for forming L and the reference value $L_V=\lambda_{12}.L$ and $L_G=\lambda_{13}.L$.

Subsequently, the reference values are fed to difference formers 264 and 265, to be compared there with the corresponding actual values for the primary air and the total air, which is formed additively from the measured actual values for the primary air and the secondary air. The control deviations serve to adjust a throttling device 255 in the primary air feed and a throttle 256 at the inlet of the internal combustion engine, until the control deviation disappears.

No controllable throttling device is provided in the secondary air feed 257. It rather contains only a constant choking point 258, which insures that, at medium load of the internal combustion engine, a pressure drop is produced in the secondary air feed which is comparable to the pressure drop in the primary air feed and the reformed gas generator. If therefore the throttle 256 is not completely open and also the throttling device 255 half open, then the flow resistance in the secondary air feed should be so high that the division of the total air stream into the primary air stream and the secondary air stream, which is inversely proportional to the flow resistances, just corresponds to the air streams required for this medium load condition. By changing the throttle 256, the two streams can be regulated simultaneously and practically without changing their mutual relation, while the ratio of the two streams can be regulated finely by changing the throttling device 254 in the primary air feed.

The calculation of the primary air number proposed here has the effect that, for an increase of the fuel supply, the reference value for the reactor temperature and, therefore, the primary air number and the primary air stream (at the expense of the secondary air stream) are raised without appreciable delay.

However, the overproportional increase of the primary air stream decays only relatively slowly when the fuel supply is set rapidly to the new steady state value. The primary air stream therefore assumes the new value corresponding to the new steady state condition with the increased load more slowly than the fuel supply. This makes possible a rapid increase of the engine power output and prevents a subsequent dip in the power output.

Since the reference value for $\lambda_{13}$ is held constant, the ratio of the fuel to the total air does not change at first. Enrichment takes place only for load jumps so great that the reference/actual difference for the total air $L_G$ is no longer balanced even though the throttle 256 is completely open. This is also desired at full load. Through the increase of $\lambda_{12}$, a more exothermic reaction is carried out and the calorific value of the reformed-gas/secondary air mixture is lowered somewhat. This is in contrast to the conventional modes of operation in gasoline operated motor vehicles, where the mixture must always be enriched for accelerating. Such enrichment can be achieved with the method according to the invention if the control, for instance, the throttle, for the total air stream or the secondary air stream responds with a time delay relative to the fuel supply and the primary air control after the gas pedal is pushed down. As a rule, the natural delay due to the inertia of the throttle is sufficient.

Figure 13:
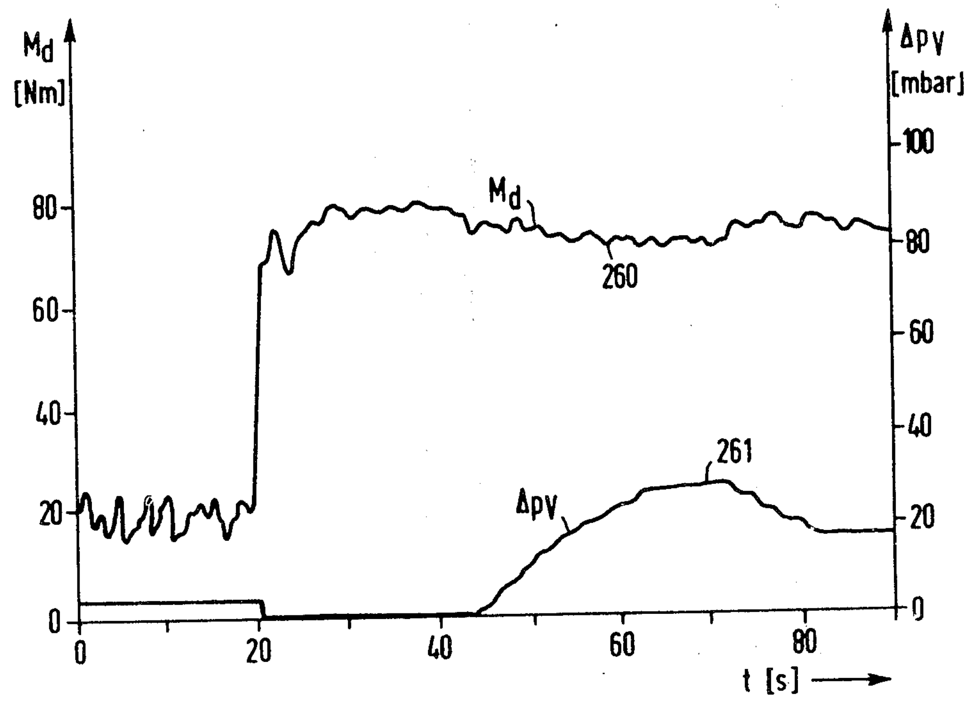
FIG. 13 illustrates curves showing the operating characteristics of a control system according to the present invention.

FIG. 13 shows, with curve 260, the torque $M_d$ if the fuel throughput is increased from 4 to 6.5 liter of "straight-run" gasoline per hour, as measured on a commercial 2 liter engine and with a device according to FIGS. 11 and 12. Curve 261 shows the pressure drop at the primary air valve 255, which is half open for a low load condition. To increase the power output, the fuel supply and at the same time the throttle 256 at the inlet of the engine is opened. This would lead to a slow increase of the primary air stream (slow increase of the pressure drop), while the nearly suddenly responding secondary air stream would increase overproportionally. This is prevented, however, by the complete opening of the primary air valve 255, which can be seen from the disappearance of the pressure drop. The reformed gas generator is thereby flushed through instantly with primary air and the torque increases in step-fashion, while the total air number remains nearly unchanged ($\lambda_{13}=1.3$). The primary air valve closes only slowly again and the primary air stream is regulated to values corresponding to the new steady state condition.

With conventional gasoline operation, the same engine permits a sudden load increase only with a heavily enriched mixture ($\lambda=0.85$), which leads to a high content of noxious substances in the exhaust gas.

What is claimed is:

1. In a method for operating a reformed gas generator, in which liquid fuel is reacted with primary air, at an elevated reactor temperature, to form a reformed gas, and an internal combustion engine connected thereto in which said reformed gas is burned with secondary air, wherein the supply of liquid fuel and total air and the ratio of the primary air stream to the secondary air stream are regulated under steady state conditions to values adapted to the steady state conditions, the improvement comprising, while operating under steady state conditions, after reaching normal operating temperature, upon an increase of the fuel supply, increasing, along with the increased fuel supply, the ratio of the primary air stream to the secondary air stream for a short time, thereby increasing the reactor temperature for said short time, corresponding the change in time of the fuel supply relative to the steady state condition.

2. The method according to claim 1, comprising regulating the ratio of the primary air stream to the secondary air stream to the value corresponding to the steady state condition, with the increased fuel supply, only after the fuel supply has already reached the steady state condition.

3. The method according to claim 1, comprising regulating the fuel supply in direct dependence on the gas pedal position and regulating the air streams in direct dependence on the fuel supply.

4. The method according to claim 1, comprising regulating the air streams in direct dependence on the gas pedal position and the fuel supply in direct dependence on the total air supply.

5. The method according to claim 1 comprising establishing a flow resistance, which causes a pressure drop comparable to the pressure drop in the primary air line and the gas generator at medium throughputs, in the secondary air line with a fixed throttling point, and regulating the primary air stream and the total air stream with a throttling device in the primary air line and a throttle at the inlet of the internal combustion engine respectively.

6. The method according to claim 1 comprising regulating the primary air stream, the secondary air stream and the total air stream separately by measuring a value corresponding to the flow in the primary air stream using a flow meter, calculating a corresponding reference value and using the control deviation between said values to control regulation of the primary air stream, measuring a value corresponding to the flow in the secondary air feed with a flow meter, calculating a corresponding reference value and using the measured and calculated values from both of said flow meters to form a control deviation for the total air stream, controlling a throttle in the mixture line with said control deviation and measuring the pressure drop at said throttle in the primary air feed with a manometer and using said pressure drop for regulating the secondary air stream.

7. The method according to claim 1 comprising calculating reference values for the fuel supply and two of the three air numbers for the primary air, the secondary air and the total air in a first electronic computing stage taking into consideration the instantaneous operating condition and the characteristic data of the internal combustion engine and the reformed gas generator; calculating reference values for at least two of the three volume flows of the primary air, the secondary air and the total air from the reference values calculated in the first stage in a second electronic computing stage; and regulating the fuel supply and the volume flows to the calculated reference values.

8. The method according to claim 1 and further including the step of also reacting said liquid fuel with a gas containing bound oxygen.

9. A method according to claim 1 comprising regulating the air streams and the fuel supply in direct dependence on the gas pedal position.

10. The method according to claim 1, comprising calculating a reference value for a quantity corresponding to the total air stream, measuring a quantity corresponding to the total air stream, and controlling the sum of the primary air stream and the secondary air stream until the control deviation between said values disappears.

11. The method according to claim 10, wherein the reference value for the quantity corresponding to the total air stream is determined from the position of the gas pedal corresponding to a steady state operating condition.

12. The method according to claim 10, comprising controlling a throttle in the mixture line of the internal combustion engine for regulating the sum of the primary air stream and secondary air stream.

13. The method according to claim 10 wherein the reference value for the quantity corresponding to the total air stream is determined from the fuel supply corresponding to a steady state operating condition.

14. The method according to claim 1, comprising increasing the primary air stream for a short time when the fuel supply is increased.

15. The method according to claim 14, comprising measuring the actual value of a quantity corresponding to the primary air stream, calculating the corresponding reference value and controlling a throttling device in the primary air feed of the reformed gas generator with the control deviation between said values.

16. The method according to claim 15, comprising measuring the primary air stream by means of a flow meter in the primary air stream to obtain said actual value.

17. The method according to claim 1, comprising throttling the secondary air stream for a short time when the fuel supply is increased.

18. The method according to claim 17, comprising measuring a quantity corresponding to the actual value of the primary air stream, calculating a corresponding reference value and controlling a throttling device in the secondary air feed until a control deviation between said values disappears.

19. The method according to claim 18, wherein the pressure drop in the primary air feed, measured by means of a manometer is used as the quantity corresponding to the primary air stream.

20. A method according to claim 18 wherein the pressure drop in the secondary air feed, measured by means of a manometer, is used as quantity corresponding to the primary air stream.

21. The method according to claim 1 and further comprising regulating the ratio of the primary air stream to the secondary air stream as a function of the reactor temperature in the reformed gas generator.

22. The method according to claim 21, wherein said ratio is regulated in accordance with the control deviation of a reference value from the actual value of the reactor temperature.

23. The method according to claim 22, and further including increasing the reference value of the reactor temperature for a short time when the fuel supply is increased.

24. The method according to claim 23, comprising establishing a temperature reference value which has a value corresponding to a new steady state condition only a short time after this condition is reached.

* * * * *